US007241253B2

(12) United States Patent
Oh et al.

(10) Patent No.: US 7,241,253 B2
(45) Date of Patent: Jul. 10, 2007

(54) FUSER ROLL WITH IMPROVED HEATING PERFORMANCE

(75) Inventors: Hieyoung W. Oh, Bowdoin, ME (US); Charles A. King, Falmouth, ME (US)

(73) Assignee: Illinois Tool Works Inc, Glenview, IL (US)

( * ) Notice: Subject to any disclaimer, the term of this patent is extended or adjusted under 35 U.S.C. 154(b) by 394 days.

(21) Appl. No.: 10/739,594

(22) Filed: Dec. 18, 2003

(65) Prior Publication Data

US 2004/0157717 A1 Aug. 12, 2004

Related U.S. Application Data

(60) Provisional application No. 60/446,466, filed on Feb. 11, 2003.

(51) Int. Cl.
*F16C 13/00* (2006.01)

(52) U.S. Cl. .......................................... 492/50; 492/56

(58) Field of Classification Search .................. 492/50, 492/56

See application file for complete search history.

(56) References Cited

U.S. PATENT DOCUMENTS 3,625,146 A * 12/1971 Hutchison ................... 101/143
3,849,062 A * 11/1974 Thettu et al. ................. 432/60
3,883,293 A * 5/1975 McCarroll ................... 432/60
4,237,592 A * 12/1980 Kuge et al. .................... 492/25
4,372,246 A * 2/1983 Azar et al. ..................... 118/60
4,864,343 A * 9/1989 Nelson ........................ 396/584
4,883,941 A * 11/1989 Martin et al. ............... 219/216
5,634,977 A * 6/1997 Ookouchi et al. .......... 118/423
5,785,636 A * 7/1998 Bonander et al. .............. 492/7
5,885,410 A * 3/1999 Berkan ....................... 156/582
6,896,647 B1 * 5/2005 Karger et al. ................. 492/50
2004/0188081 A1 * 9/2004 Oh ............................. 165/185

FOREIGN PATENT DOCUMENTS

CH 666 332 A5 * 7/1988
JP 401303261 A * 12/1989

* cited by examiner

*Primary Examiner*—David P. Bryant
*Assistant Examiner*—Sarang Afzali
(74) *Attorney, Agent, or Firm*—Mark W. Croll; Paul F. Donovan

(57) ABSTRACT

A roll cover particularly suitable for a fuser roll has an intermediate layer on the roll body and an outer surface layer including heat transfer bodies therein. The intermediate layer is a graphite sheet having legs extending along the axial extent of the roll body. The outer layer has graphite fibers embedded therein, the graphite fibers extending axially with respect to the roll.

10 Claims, 1 Drawing Sheet

FUSER ROLL WITH IMPROVED HEATING PERFORMANCE

CROSS-REFERENCE TO RELATED APPLICATIONS

The present regular United States Patent Application claims the benefit of United State Provisional Application No. 60/446,466 filed on Feb. 11, 2003.

FIELD OF THE INVENTION

The present invention relates to heat conductive structures and, more particularly, to fuser rolls in electrophotographic printing applications and structures for improving the uniformity heat conducted through such rolls.

BACKGROUND OF THE INVENTION

Many processes use heated rolls in one or more steps of the process. Some require a high degree of heat uniformity on the roll surface, to achieve uniformly acceptable results. As heat is removed from the roll, heat distribution can become transiently non-uniform, and heating the roll preferable will account for the non-uniformity that occurs during use.

For example, printers, copiers and other printing devices commonly use an electrophotographic printing process in which a uniform charge is applied to a photoconductive surface on a drum or belt. A light beam, such as from a laser, is used to expose the surface, leaving an electrostatic latent image corresponding to the image to be printed. The latent image is developed by the application of toner particles that adhere to the electrostatic latent image. The toner image is transferred to the media intended to receive the image and is fixed thereon through the application of heat and or pressure in a fuser.

The fuser commonly includes opposed cooperating rollers, one of which is heated and is commonly referred to as a fuser roll. A pressure roll is nipped there against, and the media bearing the toner image passes between the opposed rolls wherein heat and pressure is applied to fix the toner particles on the media.

For high quality printed images, heat and pressure applied must be consistent and uniform. As each piece of media passes through the fuser, heat is transferred from the fuser roll to the media in the area at which the media contacts the roll. The surface temperatures become non-uniform, and, before a next piece of media passes through the fuser, the fuser roll must be reheated. If printing on one size medium is followed immediately by printing of a different size medium, the second medium may receive non-uniform heat applied thereto from the fuser roll unless the reheating process accounts for the non-uniformity of surface temperature following the preceding fusing process. Since proper fusing of fusible inks is a function of heat residence time and pressure, if the pressure and residence time are the same but the heat applied varies from one part of the medium to another part of the medium, non-uniform fusing can occur. Under-fused inks can cause smearing, offset and other unacceptable conditions.

As heat is applied, non-uniformity can remain if all areas are heated equally, until a maximum temperature is reached and distributed evenly. A simple solution to the non-uniformity of heat distribution is to allow a sufficient time lag between fusing operations for the fuser roll to reheat and equalize. However such a delay itself can be unacceptable. In photocopiers and printers, increased speed and performance are highly sought after. Thus, delaying a subsequent printing function for a different size medium following a first size medium can require unacceptable delay in a high-speed office machine. It is known to use heat pipes to achieve improved heat distribution and uniformity. However, the heat response time of a heat pipe depends on the outer surface material, and it is often difficult to maintain a very thin outer surface on a heat pipe. The heat pipe requires a liquid or vapor within the heat pipe, and the assembly is somewhat cumbersome to install and expensive to manufacture.

It has been found in fuser rolls of electrophotographic processes that the heat response time in the radial direction is relatively short and the heat transfer rate in the axial direction of the roll is relatively slow. The difference in surface reheating can be even slower when TEFLON® material or other coatings have been applied to the fuser roll as a release agent.

What is needed in the art is an improved heated roll that transfers heat from a hotter portion thereof to a colder portion thereof.

SUMMARY OF THE INVENTION

The present invention achieves rapid heat distribution and improved heat equilibrium recovery in a heated roll through the use of highly conductive graphite fibers to transfer heat from hotter spots to colder spots of the roll.

In one aspect thereof, the present invention provides a fuser roll with a roll body, a heat conducting intermediate layer on the roll body and a surface layer on the intermediate layer, In preferred structures of the fuser roll, the intermediate layer is a flexible graphite sheet having legs oriented axially on the roll, and the surface layer is TEFLON® material with graphite strands embedded thereon, the strands oriented axially with respect to the roll.

In another aspect thereof, the present invention provides a fuser roll with a substantially cylindrical roll body; an intermediate heat conductive layer disposed on the roll body; and an outer layer providing surface release properties on the outer surface thereof, the outer layer including heat conductive bodies embedded therein.

In still another aspect thereof, the present invention provides a cover for a heated roll having a roll body. The cover has a heat conductive intermediate layer disposed on the roll body; and a surface layer disposed on the intermediate layer, the surface layer including heat transfer bodies therein An advantage of the present invention is providing a fuser roll that heats rapidly and evenly to provide uniform surface temperatures during high-speed operation.

Another advantage of the present invention is providing an improved fuser roll structure that can be manufactured and assembled easily and cost effectively.

Still another advantage of the present invention is providing a fuser roll that remains reliable in performance over an extended period of time.

A further advantage of the present invention is providing a fuser roll structure which rapidly distributes heat from hotter areas to colder areas of the fuser roll in both axial and radial directions of the roll.

A still further advantage of the present invention is providing a fuser roll that promotes heat distribution along the surface thereof using only static components not prone to failure or malfunction.

Other features and advantages of the invention will become apparent to those skilled in the art upon review of the following detailed description, claims and drawings in which like numerals are used to designate like features.

Figure 1:
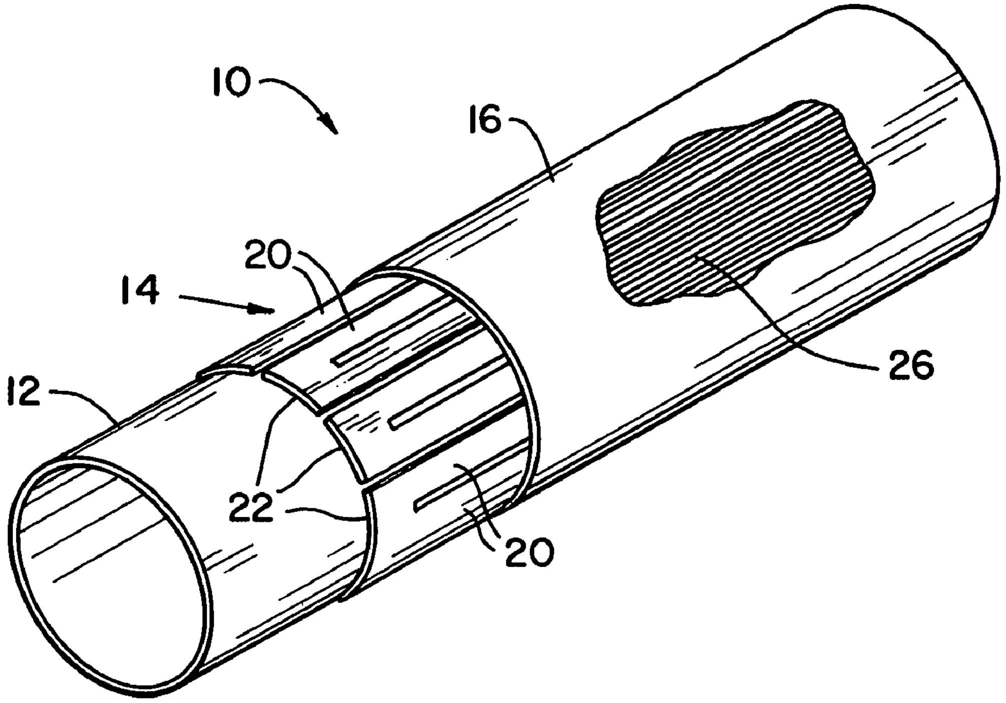
FIG. 1 is a perspective view of a fuser roll in accordance with the present invention, partially broken away to reveal interior layers of the roll.
Figure 2:
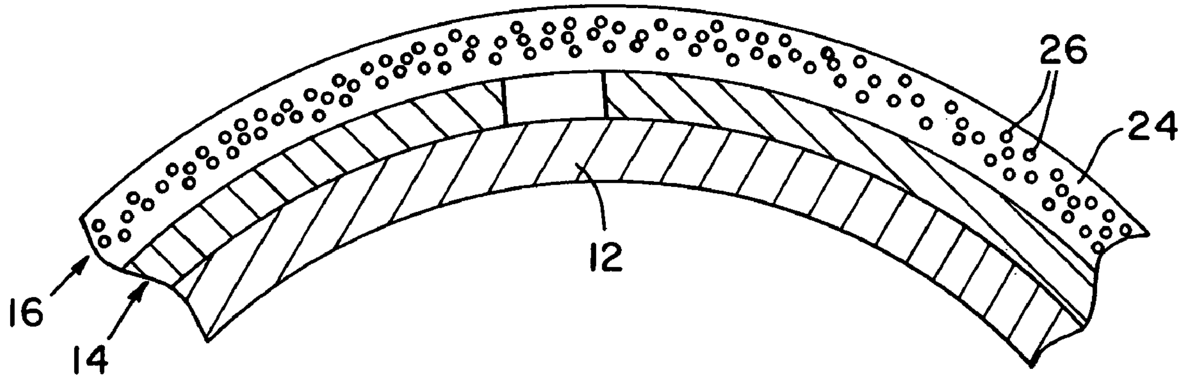
FIG. 2 is a fragmentary, cross-sectional view of the fuser roll shown in FIG. 1, taken in the radial direction of the roll.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of “including”, “comprising” and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fuser roll constructed in accordance with the present invention. Fuser roll 10 can be used as the heat source in a fuser for an electrophotographic printing process performed in a printer, copier, fax machine, or the like. While the invention is shown and described herein for use and application on a fuser roll, it should be understood that a fuser roll is merely one suitable application fur the present invention. The invention has application and utility for use with heated rolls of other types, and in devices other than printing devices.

Fuser roll 10 includes a cylindrical body or shell 12, an intermediate layer 14 and an outer layer 16. Intermediate layer 14 is applied on and bonded to roll body 12, and outer layer 16 is applied to and bonded on intermediate layer 14. Thus, in final construction, fuser roll 10 is a laminated body of applied, bonded layers on body 12.

Roll body 12 is the supporting structure for fuser roll 10 and includes roll ends, (not shown) by which the fuser roll is mounted in a printer, copier or other device. Roll body 12 is commonly constructed of aluminum and may have an insulating coating of ceramic or other suitable high temperature grade material. Roll body 12 commonly is hollow.

Intermediate conductive layer 14 is a flexible graphite sheet bonded on the outer surface of roll body 12. As known to those skilled in the art, graphite is an efficient conductor of heat, and when used as a heating element provides rapid, even distribution of heat to items in contact therewith. To function as a heater, intermediate layer 14 is connected to an electrical supply (not shown), and may be connected to appropriate thermocouples and switches (not shown) contained within the hollow interior of roll body 12. Intermediate layer 14 efficiently and rapidly distributes heat in both the axial and circumferential directions of roll body 12.

Intermediate layer 14 can be a serpentine pattern of material having legs 20 extending in the axial direction of roll 10. Connecting links 22 interconnect alternating adjacent legs 20 on opposite ends thereof. Connecting links 22 are shown in FIG. 1 only at one end; however, it should be understood that similar connecting links 22 are provided at the opposite end of legs 20 in alternating fashion with the connecting links 22 shown in FIG. 1. To form the serpentine pattern of intermediate layer 14, conductive layer 14 is die-cut from a flexible flat sheet of graphite material. Alternatively, intermediate layer 14 can be a wound layer of graphite fiber forming a coil around the outer surface of roll body 12.

Outer layer 16 provides the working surface for fuser roll 10, the surface that contacts media passing through the fuser. Therefore, the material used in outer layer 16 is selected forte particular physical properties needed for contact with the media and toner being fused thereto. It is known to use various materials on fuser roll surfaces for the nonstick or sheet release properties the materials exhibit. TEFLON® is a known material having such properties, and is known for use as the surface material on fuser rolls. TEFLON® is a suitable material for outer layer 16 also in the present invention. In contrast to known constructions in which a simple thin coating of the material is applied to a fuser roll, the present invention utilizes a composite surface layer including a matrix 24 of TEFLON® material, or other suitable material, and heat-conductive bodies such as graphite strands or fibers 26 embedded therein. Only some and not all fibers 26 are identified with a reference numeral in the drawings. Graphite fibers 26 are oriented axially along roll 10 to improve the heat conductive properties in the axial direction.

As noted previously, heat transfer in the axial direction of a fuser roll has been found to occur more slowly than in the circumferential direction. Graphite fibers have a unique anisotropic heat conduction property advantageous applied in the present invention. Heat conductivity in a graphite fiber is directionally more rapid along the length of the fiber than in the radial direction. This property is used to improve heat transfer in roll 10 in the axial direction. By embedding graphite fibers 26 in TEFLON® matrix 24, with the graphite fibers 26 oriented along the roll axial length, the fibers improve heat transfer in the axial direction. As heat is applied from intermediate layer 14, heat transfer in the axial direction is improved, and transient hotter spots in contact with graphite fibers 26 transfer heat to graphite fibers 26, and the fibers transfer heat to transiently cooler areas in outer layer 16. Therefore heat transfer and equalization occurs rapidly in both the axial and circumferential directions on fuser roll 10, and heat transfer in roll 10 in the axial direction is improved as compared with known Riser roll structures.

Materials other than TEFLON® can be used for outer layer 16. High temperature epoxy and various ceramics also are suitable materials.

A roll in accordance with the present invention is capable of variations and alterations in structure. For example, while described to include intermediate layer 14 as a heating element connected to a source of electricity, the present invention provides advantages when conventional heating sources are used for fuser roll 12. Intermediate layer 14 then functions as a heat distributing layer together with graphite fibers 26 embedded with matrix 24. The combined effect of both layers is improved heat transfer in the axial direction, and improved heat transfer from hotter areas of the roll to colder areas of the roll.

As a result of the composite structure of the present invention and the rigidity and strength provided by the graphite layers, roll body 12 can be constructed of material thinner than has been commonly used for fuser rolls. Roll 10 therefore will include less thermal mass than known fuser rolls and heating thereof is conducted more quickly and rapidly than for rolls with greater thermal mass.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fuser roll comprising:

a substantially cylindrical roll body;

an intermediate heat conductive layer disposed on said roll body, said intermediate layer being a graphite sheet;

heating means to supply heat to said intermediate layer; and an outer layer providing surface release properties on the outer surface thereof, said outer layer including heat conductive bodies embedded therein.

2. The fuser roll of claim 1, said graphite sheet including a serpentine pattern of legs and connecting links, legs extending axially along said roll body.

3. The fuser roll of claim 2, said heat conductive bodies in said outer layer being graphite fibers.

4. The fuser roll of claim 3, said graphite fibers oriented axially along said roll.

5. The fuser roll of claim 1, said heat conductive bodies in said outer layer being graphite fibers.

6. The fuser roll of claim 5, said graphite fibers oriented axially along said roll.

7. A fuser roll comprising:

a roll body;

a heat conducting intermediate layer on said roll body, said intermediate layer being a graphite sheet;

a heating supply electrically connected to said intermediate layer; and a surface layer on said intermediate layer, said surface layer having non-stick properties, said surface layer including heat conductive fibers embedded therein, and said fibers being oriented axially along said roll.

8. The fuser roll of claim 7, said sheet being a serpentine layer including legs extending axially along an outer surface of said roll.

9. The fuser roll of claim 7, said fibers being graphite fibers.

10. A cover for a heated roll having a roll body, said cover comprising:

a heat conductive intermediate layer disposed on the roll body, said intermediate layer being adapted for connection to a heating source, and said intermediate layer being a graphite sheet in a serpentine pattern having legs extending axially along the roll body and connecting links connecting legs of said sheet; and a surface layer disposed on said intermediate layer, said surface layer including heat transfer bodies therein, said heat conductive bodies being graphite fibers axially oriented between two ends In said cover with respect to said roil body.

* * * * *